Aug. 30, 1966     E. A. REZABEK     3,269,357
FARROWING ENCLOSURE
Filed Oct. 1, 1964                         2 Sheets-Sheet 1
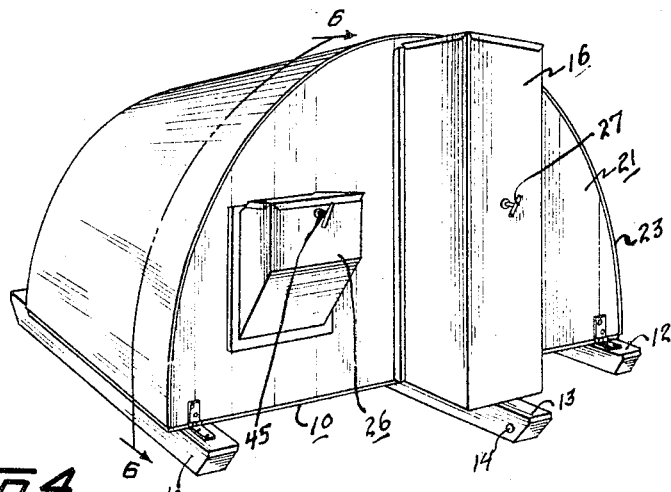
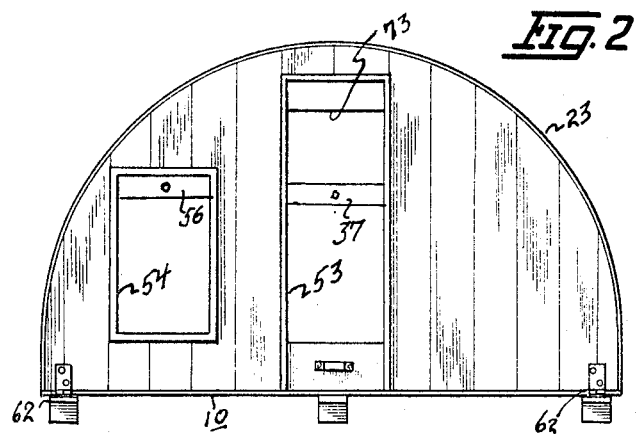
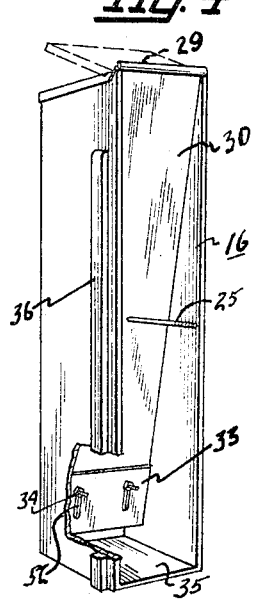
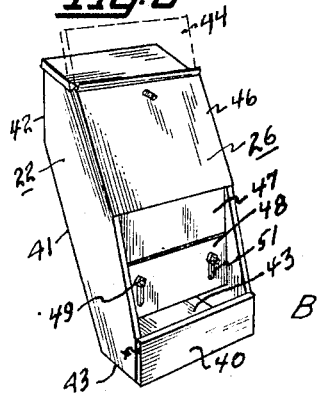
INVENTOR.
EUGENE A. REZABEK
BY Corey & Corey
ATTORNEYS Aug. 30, 1966  E. A. REZABEK  3,269,357
FARROWING ENCLOSURE
Filed Oct. 1, 1964  2 Sheets-Sheet 2
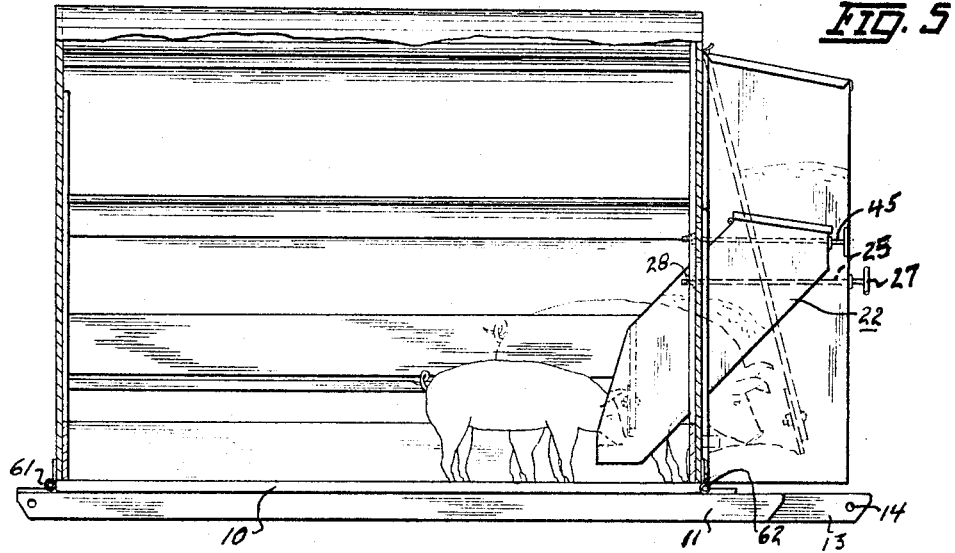
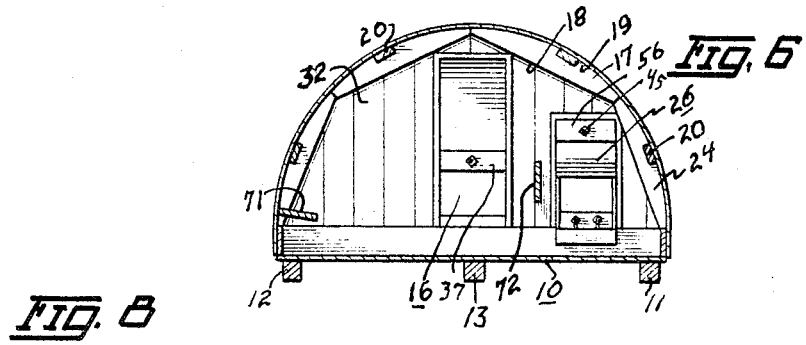
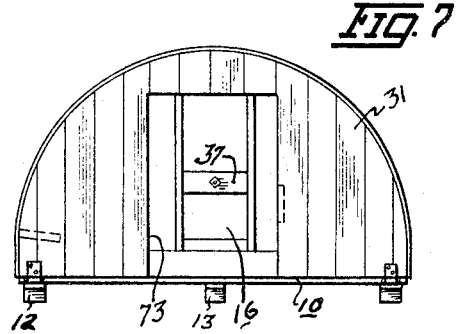
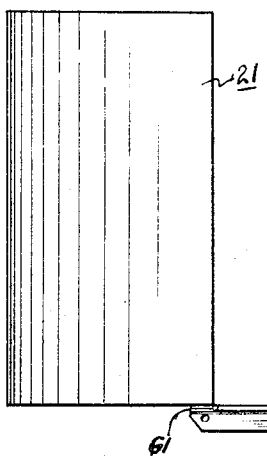
INVENTOR.
EUGENE A. REZABEK
BY Corey & Corey
ATTORNEYS

United States Patent Office 3,269,357
Patented August 30, 1966

3,269,357
FARROWING ENCLOSURE
Eugene A. Rezabek, Wilber, Nebr.
Filed Oct. 1, 1964, Ser. No. 400,759
1 Claim. (Cl. 119—16)

This invention relates to the art of animal husbandry and has particular relation to hog and pig feeding means. The use of open troughs for feeding piglets, pigs and hogs is of course quite old in the art, but with the advent of special feeding supplements, special feed for pigs and hogs and special feeds for the animals at different stages of their growth as well as different conditions, with the necessity of affording dry, clean and adequate protection for the animals, the simple open feeders can no longer be used to provide the selective feeds. Furthermore the shelters must be kept clean and dry for best and most economical growth of the animals. Such feeding means must provide for individual feeding of different classes and sizes of animals and yet, in this time of high labor costs, must minimize to the utmost the work necessary in providing for and feeding the animals and cleaning the hog houses.

It is among the objects of my invention to meet the requirements above set forth and to provide a hog house in which both hogs and pigs may feed at the same time but from individual troughs, each with their own feed as fortified by food supplements and the like and mixed to the needs for the animals. One animal may require more or less enriched material, vitamins or like food supplement to a greater or less degree than that of another animal.

Furthermore the baby pigs must be protected from the sow, and it is among the objects of my invention to secure this result.

A still further object of my invention is to provide individual feeding means, both for baby pigs and the sow.

Still another object of the invention is to provide a readily disassembled and movable hog house and one in which the feeding floor is readily and entirely exposed as desired for cleaning.

Other and further features and objects of the invention will be more apparent to those skilled in the art upon a consideration of the accompanying drawings and following specifications, wherein is disclosed a single exemplary embodiment of the invention, with the understanding however, that such changes may be made therein as fall within the scope of the appended claim, without departing from the spirit of the invention.

In said drawings:

FIGURE 1 is a view in perspective of a hog house constructed according to one embodiment of my invention, with the feed bins in place.

FIGURE 2 is a view in front elevation of the hog house but with the feeders removed.

FIGURE 3 is a view in perspective of a self-feeder or creep feeder for the baby pigs.

FIGURE 4 is a view from inside of a self-feeder for the sow. A portion of the wall of the feeder has been cut away to show the adjustable door for regulating the amount of feed.

FIGURE 5 is a view in side elevation showing the creep feeder with a baby pig feeding and with the feeder for the sow shown in dotted lines. Part of the side of the hog house has been removed to illustrate the interior.

FIGURE 6 is a view along the line 6—6 of FIGURE 1 and showing the interior of the feeder with the creep feeder and sow feeder in place, and illustrating in place the means for separating the baby pigs from the sow.

FIGURE 7 is a rear elevational view of the hog house, and

FIGURE 8 is a view in side elevation of the hog house in its raised position for the purpose of cleaning the feeder floor. The creep feeder and sow feeder have been removed.

Referring now to the drawings:

A hog house constructed according to a preferred embodiment of my invention includes a substantially rectangular platform, indicated at 10, which may be mounted on wheels or rest directly on the ground or on blocks or a cement pad, but preferably is mounted on three skids, as shown at 11, 12 and 13, the middle skid 13 being longer than the other two to afford a means for attaching a towing cable, as at 14.

The member 21 is the house or cover for the platform 10 and the delivery ends of the feeders 16.

The feeder 22 is a creep self-feeder for the baby pigs. It too is removable for cleaning of feeder and hog house.

The house or cover 21, for ready construction and self support, is preferably of a semi-cylindrical form with both ends closed as illustrated in FIGURES 1, 2, 6, 7 and 8 and in the cut-away section of FIGURE 5. The roof and sides illustrated at 23 may be of metal or wood or any other suitable material, but a preferred construction, best shown in FIGURE 6, employs wood bows indicated generally at 24 at either end. The bows are preferably constructed of a series of fairly heavy sections of timbers, as at 17, flat on their inner faces as at 18 and curved at their outer faces as at 19 to receive the roof which may be of metal, either flat or corrugated. Supporting rafters at 20 are employed between the opposite roof bows to furnish additional support for the roof and to brace the structure against the movement of the sow and pigs and to prevent distortion and breakage.

The ends of the structure, as at 31 and 32, are preferably of car siding for best permanence and for carrying the various static and impact pressure loads.

The feeder 16 for the sow is a box extending substantially the entire height of the semi-cylindrical end of the hog house, and this unit is removable for cleaning and is secured in its operative position by any suitable means such as a long bolt, indicated at 25, and having the T handle indicated at 27. This bolt has threaded engagement with the nut 28 in a cross bar 37 on the inner side of the framing of the end wall 31.

The feeder 16 has a removable top indicated at 29, and a partition 30 extends diagonally downward to a position near the bottom 35 of the box 16, but spaced away from it sufficiently to let feed drop through and onto the floor 35 where it can be reached by the sow. The member 33 is an adjustable panel for regulating to a greater or less degree the amount of feed and the flow of feed to the floor 35. The members 34 are locking means for locking the adjustable panel 33 in any desired position. The members 36 on either side of the feeder 16 act to stiffen the side walls of the feeder box, and also to limit and define its position in the end of the house, as illustrated in FIGURE 1.

The creep feeder, illustrated in FIGURE 3 and also in FIGURES 1, 5 and 6, has an inclined rear wall 41 terminating at its upper end in a vertical wall 42 and at its lower end in a horizontal wall or paltform 43. It too has a removable top 44 for loading feed. An inclined cover 46 and a vertical partition 47 confine the feed. An adjustable partition 48 may be locked in any desired vertical position by means of locking means 49 with slots 51 permitting vertical adjustment of the regulating partition as desired, just as the slots 52 permit vertical adjustment of the partition 33 in the feeder 16. The large feeder is received in the opening 53, while the smaller creep feeder 22 is received in the smaller opening 54. A T-bolt 45 permits removably securing the creep feeder to a nut in the cross bar 36 of the cover.

The lip portion 40 at the front of the creep feeder is hinged at its lower inside edge so that it may be let down to lie flat to allow the baby pigs easy access to the feed to train them to eat. After they have learned food is obtainable at this point, the lip may be raised and fastened in place to act as a retard to limit spilling of feed.

As best illustrated in FIGURE 8, the entire semi-cylindrical house may be tilted back to a vertical position to thus expose the feeding floor or platform 10 for cleaning. Of course the large feeder and the creep feeder are removed before the top is tilted back. For cleaning purposes, a pair of hinges are provided at 61 at the back of the structure, and removable loose pins are provided at the front at hinges 62 to permit ready disengagement of the front wall from the skids for tilting.

The members 71 and 72 extend from end to end of the house and afford not only stiffening members but also means for preventing the sow from crushing or stepping on or interfering with the baby pigs. The rear wall of the hog house is provided with an opening or door, as indicated at 73, so that the hogs and pigs may go in and out of the hog house.

It is apparent that I have provided an extremely simple and strong feeding house for hogs and pigs which will separate the two different sized animals and permit feeding them each the food ration they should have. The pigs and the sow are separated sufficiently that injury to the pigs by the sow will not occur.

Most important is the fact that not only is this separation of feed secured, but also the whole hog house may be readily cleaned by tilting it back off the foundation, and of course the house can be moved about readily from place to place as desired.

Although I have described a specific embodiment of my invention, it is apparent that modifications thereof may be made by those skilled in the art. Such modifications may be made without departing from the spirit and scope of my invention as set forth in the appended claim.

I claim as my invention:

A food storage and feeding structure for the self-feeding of hogs comprising a feeding platform, a semi-cylindrical cover having end walls and a longitudinal rail extending between the end walls of the cover and above the platform for dividing the platform into two areas, one for a sow and one for pigs, one end wall of the feeder having a large vertical opening therein, a box-like self-feeder, means for removably mounting the self-feeder in the large opening, the wall having a second opening to one side of the central portion communicating with the interior of the cover at the area for the pigs, a creep feeder removably engaged in this second opening, a removable locking means for locking the cover to the platform at the end in which the named openings are located, and hinges connecting the cover and platform at the opposite end, the last named end having a door therein for passage in and out of the sow and pigs.

References Cited by the Examiner

UNITED STATES PATENTS

| | | | |
|---|---|---|---|
| 809,543 | 1/1906 | Vail | 119—20 |
| 920,975 | 5/1909 | Minion | 119—19 |
| 978,010 | 12/1910 | Faust | 119—18 |
| 2,008,637 | 7/1935 | Burrus et al. | 119—20 |

SAMUEL KOREN, *Primary Examiner.*

HUGH R. CHAMBLEE, *Examiner.*